United States Patent
Papandreou

[19]

[11] Patent Number: 5,887,494
[45] Date of Patent: Mar. 30, 1999

[54] MULTI-GEAR ATTACHMENT TOOL FOR A STEERING WHEEL ASSEMBLY

[75] Inventor: John P. Papandreou, Medford, N.Y.

[73] Assignee: TRW Inc., Lyndhurst, Ohio

[21] Appl. No.: 909,426

[22] Filed: Aug. 11, 1997

Related U.S. Application Data

[60] Provisional application No. 60/029,498 Oct. 29, 1996.
[51] Int. Cl.⁶ .................................................... B25B 17/00
[52] U.S. Cl. ........................ 81/57.29; 81/57.13; 81/57.33
[58] Field of Search ........................ 81/57, 57.13, 57.29,
81/57.15, 57.33, 57.42

[56] References Cited

U.S. PATENT DOCUMENTS

| | | | |
|---|---|---|---|
| 1,333,532 | 4/1920 | Berk ........................................ | 81/57.29 |
| 1,494,200 | 5/1924 | Waters .................................... | 81/57.29 |
| 1,745,560 | 4/1930 | Seilheimer . | |
| 1,861,728 | 6/1932 | Vanice et al. ........................... | 81/57.15 |
| 2,694,953 | 11/1954 | Williams ................................. | 81/57.29 |
| 4,064,772 | 12/1977 | Boyd et al. ............................. | 81/57.29 |
| 4,171,651 | 10/1979 | Dacunto . | |
| 4,258,594 | 3/1981 | Welch ..................................... | 81/57.29 |
| 4,311,072 | 1/1982 | Hudgins ................................. | 81/57.29 |
| 4,685,848 | 8/1987 | Langer . | |
| 4,827,810 | 5/1989 | Rushanan . | |
| 4,913,007 | 4/1990 | Reynolds ................................ | 81/57.29 |
| 5,052,496 | 10/1991 | Albert et al. ........................... | 81/57.13 |
| 5,144,861 | 9/1992 | Nishijima et al. . | |
| 5,692,769 | 12/1997 | Scharboneau et al. . | |
| 5,692,770 | 12/1997 | Scharboneau et al. . | |
| 5,749,598 | 5/1998 | Exner et al. . | |

FOREIGN PATENT DOCUMENTS 3-221379  9/1991  Japan .................................... 81/57.13

OTHER PUBLICATIONS

GMI Engineering and Management Institute Senior Thesis Project, "Design of a One–Piece Steering Wheel/Airbag Cover," by Mark Scharboneau dated May 28, 1993.

*Primary Examiner*—David A. Scherbel
*Assistant Examiner*—Daniel Shanley
*Attorney, Agent, or Firm*—Tarolli, Sundheim, Covell, Tummino & Szabo

[57] ABSTRACT

An apparatus includes a housing, a channel (51) within the housing, and a plurality of spur gears (55b, 56, 57, 58) disposed within the channel and in gear meshing engagement. A first one (58) of the plurality of spur gears protrudes from the housing. First and second meshing bevel gears (54, 55a) impart rotation to the plurality of spur gears. The first bevel gear (55a) is rotatable about an axis coaxial with a second one (55b) of the plurality of spur gears. The first bevel gear (55a) is fixed for rotation with the second spur gear (55b). The second bevel gear (54) has a drive connection (60) which, when rotated, causes rotation of the plurality of spur gears by rotating the first and second bevel gears.

15 Claims, 5 Drawing Sheets

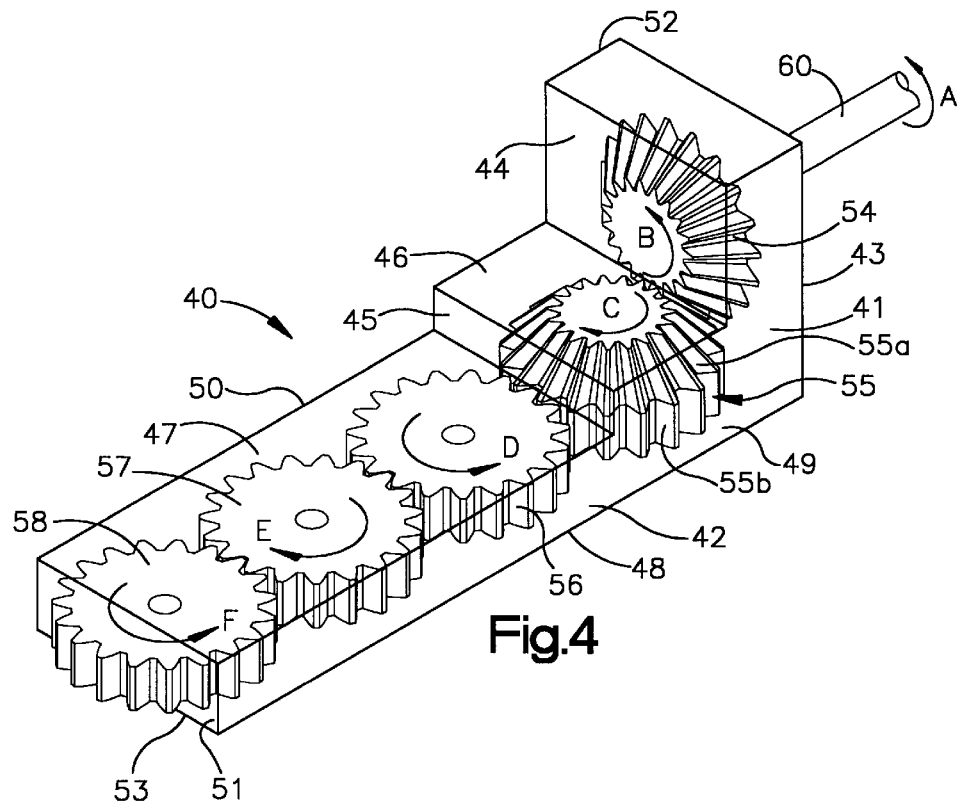
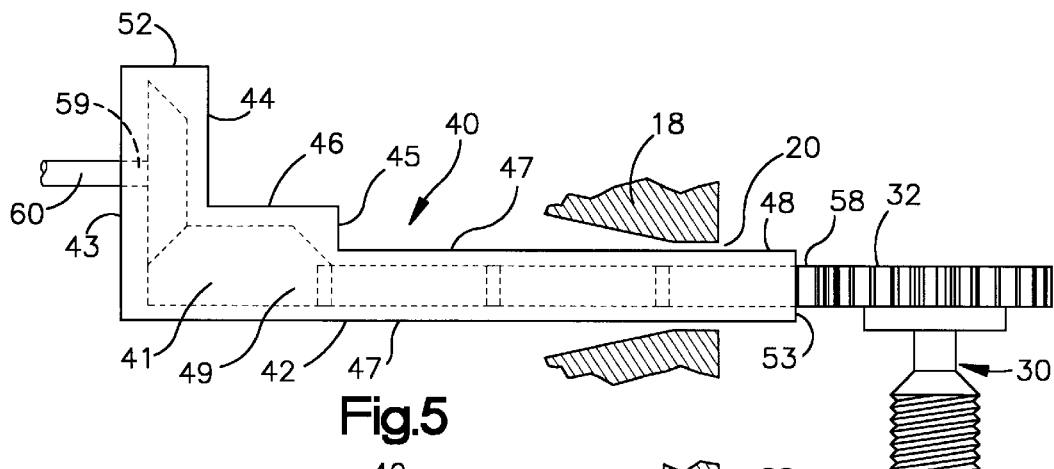
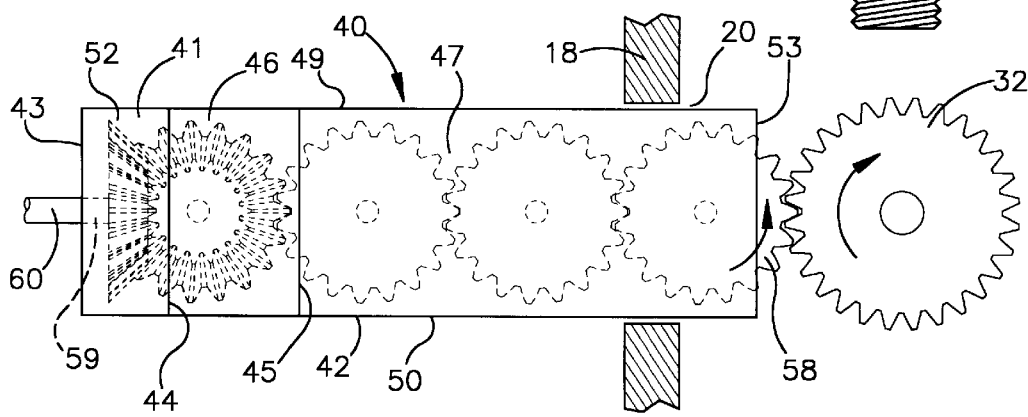

MULTI-GEAR ATTACHMENT TOOL FOR A STEERING WHEEL ASSEMBLY

RELATED APPLICATION

This application claims priority from United States provisional patent application Ser. No. 60/029,498, filed Oct. 29, 1996, entitled "Means for Attaching a Pre-assembled or Integral Steering Wheel Assembly onto the Steering Column Shaft Using Conventional Coupling Means".

FIELD OF THE INVENTION

The present invention relates to a multi-gear attachment tool for attaching a steering wheel and air bag assembly to a steering shaft of a vehicle. More particularly, the present invention relates to a multi-gear attachment tool for attaching a steering wheel and air bag assembly to a steering shaft of a vehicle that permits the entire steering wheel and air bag assembly to be assembled prior to attachment to the steering shaft.

BACKGROUND OF THE INVENTION

A typical assembly process for a vehicle steering wheel having a driver's side air bag involves a series of sequential steps. For example, a steering wheel is first attached to a steering shaft using a fastener which is accessed and tightened in a center area of the steering wheel. Next, an air bag module is placed in the center area of the steering wheel and secured thereto.

SUMMARY OF THE INVENTION

The present invention is an apparatus comprising a housing, a channel within the housing and a plurality of spur gears disposed within the channel and in gear meshing engagement. A first one of the plurality of spur gears protrudes from the housing. First and second meshing bevel gears impart rotation to the plurality of spur gears. The first bevel gear is rotatable about an axis coaxial with a second one of the plurality of spur gears. The first bevel gear is fixed for rotation with the second spur gear. The second bevel gear has a drive connection which, when rotated, causes rotation of the plurality of spur gears by rotating the first and second bevel gears.

The present invention is a tool for use in attaching a steering wheel and air bag assembly to a steering shaft of a vehicle. The first spur gear which protrudes from the housing meshes with a spur gear portion of a fastener to rotate the fastener in one direction. The fastener, when rotated in the one direction, secures the steering wheel and air bag assembly to the steering shaft.

BRIEF DESCRIPTION OF THE INVENTION

Further features of the present invention will become more apparent from the ensuing description when considered together with the accompanying drawings wherein:

FIG. 4 is a schematic perspective view of a multi-gear attachment tool for attaching the steering wheel and air bag assembly shown in FIGS. 1–3 to a vehicle steering shaft;

FIG. 5 is a schematic side view of the multi-gear attachment tool shown in FIG. 4;

FIG. 6 is a schematic top view of the multi-gear attachment tool shown in FIG. 4.

DESCRIPTION OF A PREFERRED EMBODIMENT

Figure 1:
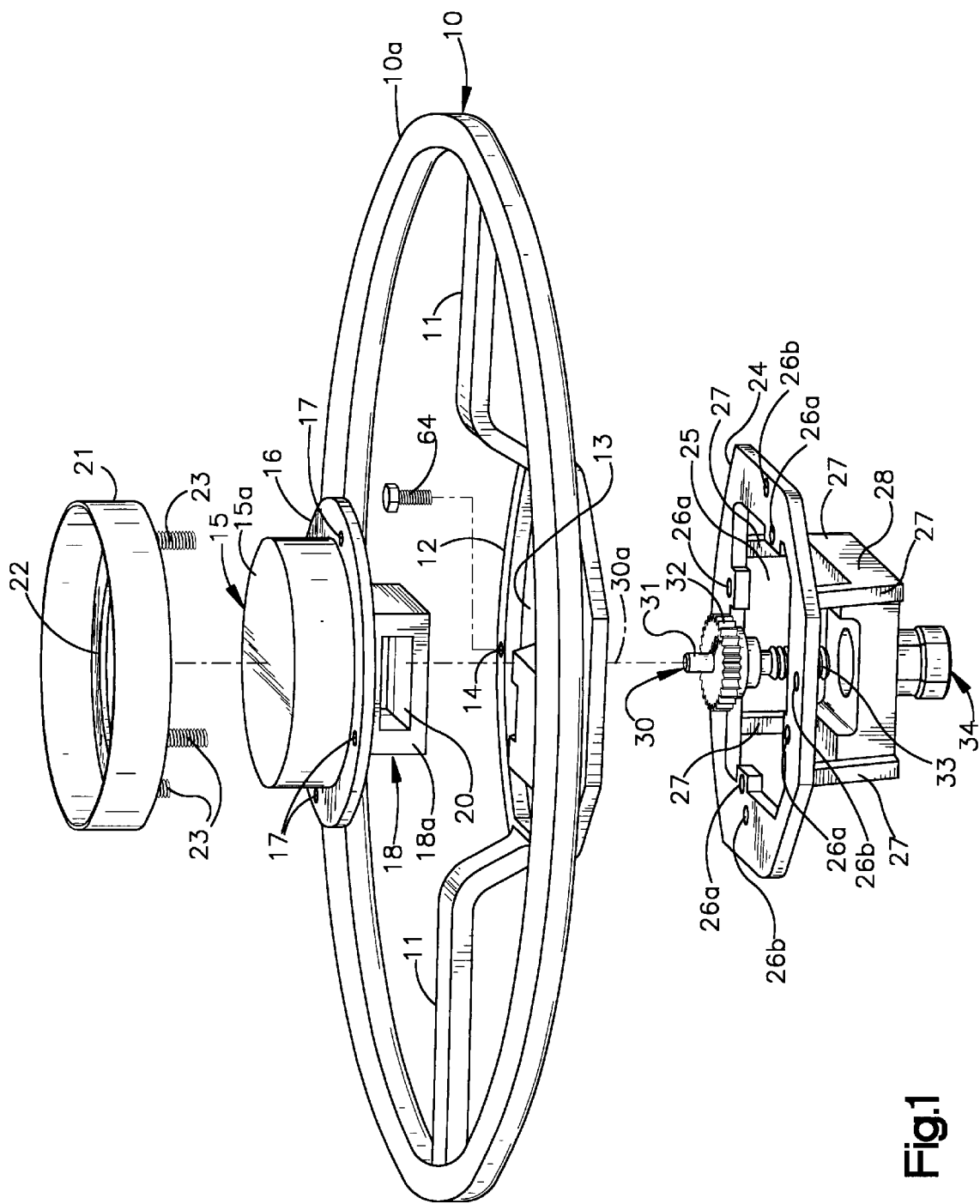
FIG. 1 is an exploded perspective view illustrating a steering wheel and air bag assembly.

With reference to the various figures wherein like reference numerals identify like parts, FIG. 1 illustrates a steering wheel and air bag assembly which includes a die cast steering wheel armature 10 having a rim 10a, a plurality of inwardly disposed radial arms (or spokes) 11, and an upper frame 12. The upper frame 12 is fixedly connected to the rim 10a by the spokes 11. The upper frame 12 has a central opening 13 defined therein and is provided with a plurality of spaced apertures 14 about its periphery for receiving a plurality of fasteners 64.

Figure 3:
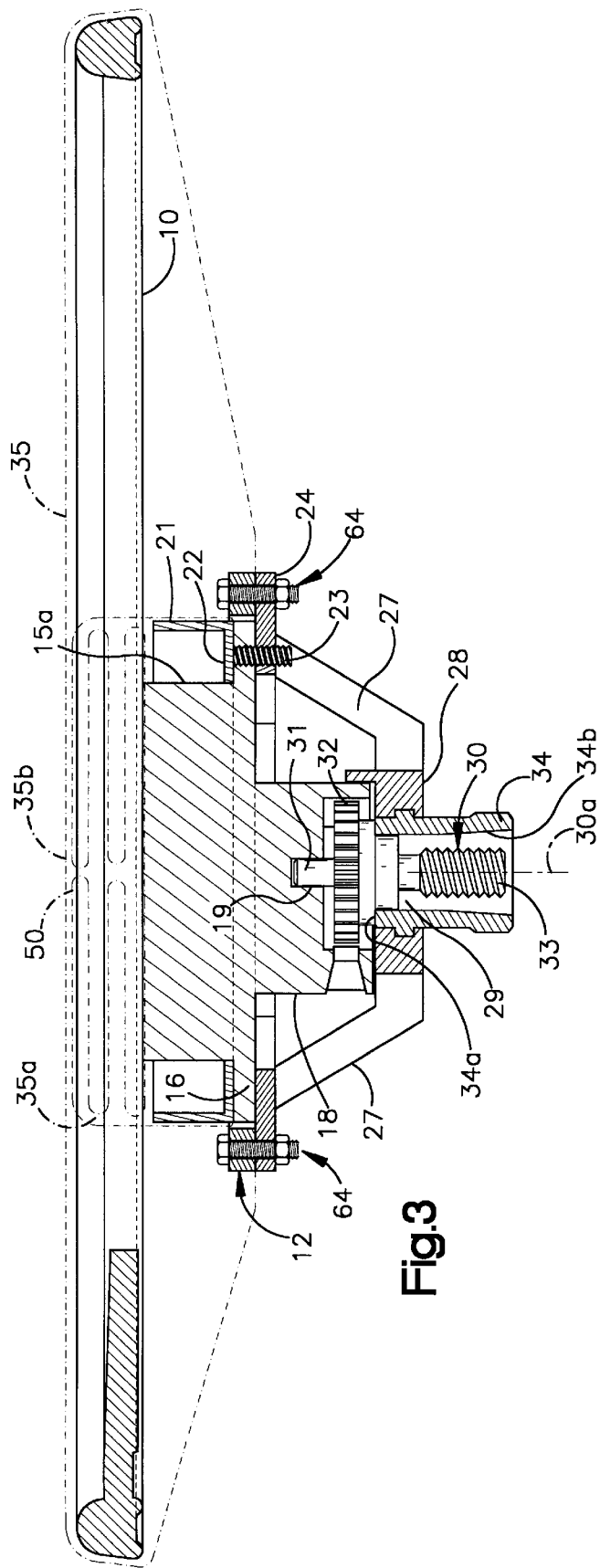
FIG. 3 is a sectional view of the steering wheel and air bag assembly of FIG. 1.

An air bag inflator 15 (FIG. 1) provides inflation fluid to inflate an inflatable vehicle occupant restraint or air bag 50 (shown schematically in FIG. 3). The inflator 15 has a cylindrical housing 15a. The bottom of the inflator housing 15a has an outwardly extending flange 16 with a plurality of circumferentially spaced apertures 17 formed therein. A centrally positioned guide portion 18 extends downward from the inflator housing 15a. The guide portion 18 can be formed integrally with the housing 15a or as a separate part. The guide portion 18 has a centrally located axially extending bore 19 formed therein (FIG. 3). The guide portion also has a chamber 20 defined therein (FIG. 1). The chamber 20 intersects a wall 18a of the guide portion 18.

An air bag retainer 21 secures the air bag 50 to the inflator housing 15a. The retainer 21 has an inwardly extending, circumferential flange 22 at its lower end and a plurality of downwardly extending, circumferentially spaced studs 23 which are positioned to be received through openings (not shown) in the air bag 50 and then also through the apertures 17 in the flange 16 of the inflator housing 15a. The air bag 50 is thus retained by being clamped between the inflator flange 16 and the retainer flange 22, with the retainer 21 being disposed inside the air bag.

An integral cover 35, shown schematically in FIG. 3, is molded about the steering wheel armature 10. In particular, the cover 35 covers the rim 10a, spokes 11 and the perimeter of the upper frame 12. The cover 35 defines a chamber 35a in which the air bag 50 and the inflator 15 are located. The cover 35 has an upper continuous surface 35b which extends uninterruptedly over the air bag 50, the inflator 15, and the steering wheel armature 10. Thus, the cover 35 covers the inflator 15 and the air bag 50 as well as the armature 10. In accordance with the preferred embodiment of the invention, the cover 35 is made of a urethane material. It is contemplated that the cover 35 could be made from several cover portions rather than the integral cover shown. For example an alternate cover could include a first cover portion covering the steering wheel rim 10a and a second cover portion covering the air bag 50.

The steering wheel and air bag assembly includes a lower frame 24 having a central opening 25 defined therein and a plurality of spaced apertures 26a formed about its periphery for receiving the studs 23 therethrough. The lower frame 24 also has a plurality of spaced apertures 26b for receiving the fasteners 64 to connect the lower frame to the upper frame 12. The lower frame 24 further includes a plurality of depending legs 27 which support a generally rectangular sub-frame 28.

A tubular-shaped hub 34 is fixedly connected to the lower frame 24 and includes a central passage 29 to receive a portion of a rotatable fastener 30 described below. The hub 34 includes an upper surface 34a which extends radially from the central passage 29. An inner surface 34b of the hub 34 is partially tapered, as may be seen in FIG. 3, for receiving a tapered outer surface on one end of a vehicle steering shaft (not shown).

The rotatable fastener 30 (FIG. 3) comprises a first end portion 31, a spur gear portion 32, and a second end portion 33. The spur gear portion 32 is intermediate the first and second end portions 31, 33. The first end portion 31, the spur gear portion 32, and the threaded second end portion 33 of the fastener 30 are fixed together and rotate together. Preferably, the fastener 30 is made from one piece of a metallic material.

The second end portion 33 of the fastener 30 is externally threaded and screws into an internally threaded opening in the tapered end of the steering shaft. The fastener 30 is rotatable about its axis 30a which is coaxial with the axis of rotation of the vehicle steering shaft.

The fastener 30 rests on and is supported for rotation by the upper surface 34a of the hub 34. The first end portion 31 of the fastener 30 is located and rotatable in the axial bore 19 in the guide portion 18. The second end portion 33 of the fastener 30 extends into the passage 29 in the hub 34, and terminates approximately in the plane in which the hub 34 terminates.

Figure 2:
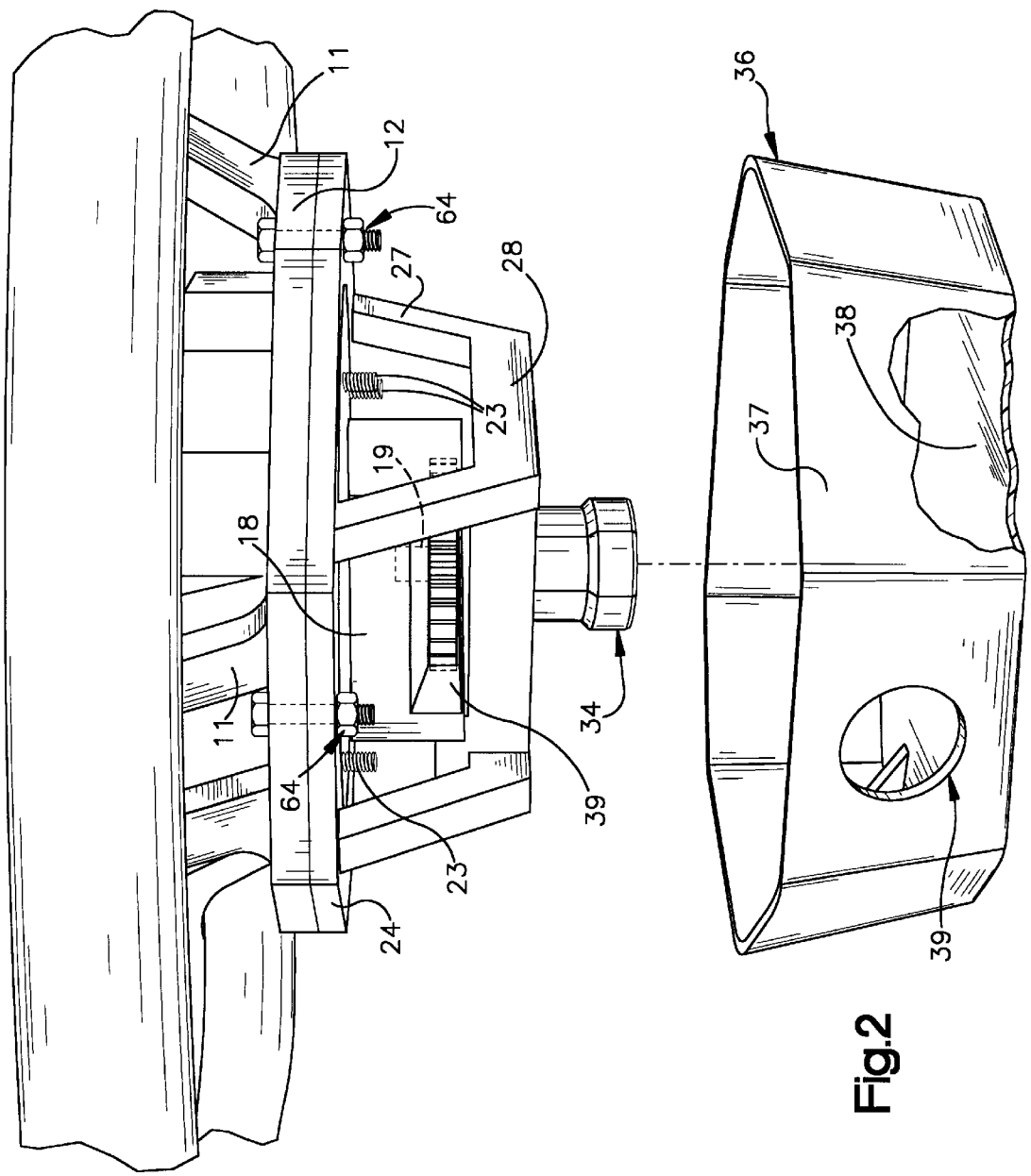
FIG. 2 is an enlarged exploded perspective view of the steering wheel and air bag assembly shown in FIG. 1 and showing additional parts.

A lower cover 36 which covers the lower frame 24 is illustrated in FIG. 2. The lower cover 36 can be constructed to have a single, circular side wall or a plurality of contiguous, angularly joined panels forming the side wall 37 and a bottom wall 38. An opening 39 in the side wall 37 serves as an access means to facilitate entry within the lower cover 36 to position and engage or disengage and remove a multi-gear attachment tool 40 to be described later without the need to remove the lower cover 36. An aperture (not shown) is provided in the center of the bottom wall 38 to accommodate the extension of the hub 34 therethrough.

The assembly of the aforementioned parts includes locating the fastener 30 on the upper surface 34a of the hub 34. Then, studs 23 are positioned through the apertures (not shown) in the air bag 50, through the apertures 17 in the inflator flange 16, and through the apertures 26a in the lower frame 24 while guiding the first end portion 31 of the fastener 30 into the axial bore 19 in the guide portion 18. Nuts (not shown) are threaded onto the ends of the studs 23 to secure the retainer 21, the air bag 50 and the inflator 15 to the lower frame 24.

The upper frame 12 of the steering wheel armature 10 is then attached to the lower frame 24 by the fasteners 64 which extend through the apertures 14 in the upper frame 12 and the apertures 26b in the lower frame 24. Next, the bottom cover 36 is secured by fasteners (not shown) to the lower frame 24 so that the hub 34 extends beyond the planar surface of the bottom wall 38 of the bottom cover 36 and the access port 39 in the side wall 37 of the bottom cover 36 is approximately aligned with the spur gear portion 32 of the fastener 30. The steering wheel and air bag assembly is then complete and is thus ready to be secured to the steering shaft.

The steering wheel and air bag assembly is secured to the steering shaft by first locating the hub 34 coaxial with the steering shaft. When so located, the threaded second end portion 33 of the fastener 30 is aligned with the internally threaded opening in the end of the steering shaft. The multi-gear attachment tool 40 for rotating the fastener 30 can be now inserted through the access opening 39 in the lower cover 36.

As illustrated in FIGS. 4, 5 and 6, the multi-gear attachment tool 40 has a generally L-shaped housing defined by a stepped, vertically (as shown in the drawings) disposed short leg 41 and a horizontally (as shown in the drawings) disposed long leg 42. The short leg 41 has a first wall 43, a second wall 44 and a third wall 45. The walls 43, 44 and 45 are parallel to each other and are spaced from each other. The second and third walls 44 and 45 are interconnected by a wall 46. The third wall 45 is shorter than the second wall 44.

The long leg 42 has an upper wall 47 and a lower wall 48 spaced from the upper wall 47. The first wall 43, the second wall 44, and the third wall 45 as well as the wall 46 are joined to the upper wall 47 and the lower wall 48 by side walls 49 and 50 so as to collectively define a rectangularly-shaped L-shaped channel 51 therebetween (FIG. 4). The end of channel 51 at the upper end of short leg 41 is closed by a wall 52, while the end of the channel 51 at the terminal end of the long leg 42 is open as indicated by reference numeral 53.

A plurality of gears 54, 55, 56, 57 and 58 are located in the channel 51. Although five gears are shown, it should be understood that the number of gears may be different depending upon the specific requirements of the application. Gears 54 and 55 are located inside the short leg 41, while the gears 56, 57 and 58 are located inside the long leg 42. Gear 54 is a bevel gear which rotates about a horizontal (as viewed in the drawings) axis. Gear 55 includes a bevel gear portion 55a fixed for rotation with a spur gear portion 55b. Gears 55–58 rotate about respective vertical (as viewed in the drawings) axes. Each of the gears 55–58 has a stub shaft mounted in the housing and supporting a respective one of the gears for rotation relative to the housing. The length of the long leg 42 is such that a portion of the spur gear 58 is positioned to protrude beyond the open end 53 of the long leg 42 to facilitate its engagement with the spur gear portion 32 of the fastener 30 during installation or removal of the steering wheel assembly.

The first wall 43 of the short leg 41 is provided with an opening 59 to permit a shaft 60 which extends from the bevel gear 54 to protrude through the wall 43. The shaft 60 is to be engaged by a conventional driving device to rotate the shaft 60.

When the shaft 60 is rotated, for example, in a direction indicated by arrow A in FIG. 4, the bevel gear 54 is rotated in the direction indicated by arrow B in FIG. 4. The bevel gear portion 55a, which is meshed with the bevel gear 54, is rotated in the direction indicated by arrow C in FIG. 4. The spur gear portion 55b is also rotated in the direction of arrow C and, due to its meshing engagement with spur gear 56, causes the spur gear 56 to rotate in the direction indicated by arrow D in FIG. 4. The spur gear 57, which is meshed with the spur gear 56, is caused to rotate in the direction indicated by arrow E in FIG. 4. Since the spur gear 58 is meshed with the spur gear 57, spur gear 58 is rotated in the direction indicated by arrow F in FIG. 4.

Conversely, it should be understood that if the shaft 60 of the bevel gear 54 is rotated in a direction opposite to the direction indicated by arrow A, the resulting sequential rotation of the gears 54–58 would be opposite that indicated by the arrows B–F, respectively, in FIG. 4.

To complete the attachment of the steering wheel assembly to the steering column, the long leg 42 of the multi-gear attachment tool 40 is inserted into and through the access port 39 in the bottom cover 36 until the spur gear 58 engages and meshes with the gear portion 32 of the fastener 30 as shown in FIGS. 5 and 6. Rotation of the gears 54-58 of the tool 40 in the appropriate direction causes the fastener 30 to rotate in a tightening direction and to become screwed into the internally threaded opening in the end of the vehicle steering shaft. Such rotation of the meshed gears 58 and 32 creates forces which tend to cause the tool 40 to rotate.

The tool 40 has means, comprising housing walls 49 and 50, for resisting movement of the tool. The housing walls 49 and 50 have surfaces which extend parallel to the axes of the spur gears 56, 57 and 58. One of the housing walls 49 or 50 transmits forces tending to rotate the tool, depending on the direction of rotation of the spur gear 58, to a corresponding side wall of the chamber 20 in the guide portion 18 which abuts the side wall 49 or 50. Hence, the close receipt of the tool 40 in the chamber 20 is essential to resisting rotation movement of the tool 40 during tightening. As shown in FIG. 1, the chamber 20 has a rectangular shape closely corresponding to the rectangular shape of the end of the multi-gear attachment tool 40.

The rotation of the fastener 30 in the tightening direction moves the fastener axially toward the steering shaft, thereby forcing the steering wheel and air bag assembly downward relative to the steering shaft as viewed in FIG. 3. As the steering wheel assembly is forced downward relative to the steering shaft, the tapered surfaces on the hub 34 and on the steering shaft are pressed together to secure the steering wheel and air bag assembly to the steering shaft. In addition, complimentary flats (not shown) on the hub 34 and on the steering shaft provide an alignment of the steering wheel air bag assembly on the steering shaft as well as a means for transmitting torque from the steering wheel to the steering shaft.

With the steering wheel and air bag assembly connected to the steering shaft, torque which is produced by turning the steering wheel (i.e., steering the vehicle) is transmitted through the spokes 11 to the interconnected upper and lower frames 12 and 24, to the hub 34 which is fixed to the lower frame 24, and from the hub 34 to the steering shaft.

The description above relates to attaching the steering wheel and air bag assembly to the steering shaft of a vehicle by rotation of the fastener 30 in a tightening direction. After the steering wheel and air bag assembly is secured to the steering shaft by the fastener 30, it can be removed from the steering shaft by rotation of the fastener 30 in an untightening direction opposite the tightening direction of rotation. Rotation in the untightening direction causes the fastener 30 to move axially and relatively away from the steering shaft. The top end of the first end portion 31 of the fastener 30 will abut against a facing surface of the axial bore 19 in the guide portion 18. This will apply an upward force on the steering wheel and air bag assembly and, particularly the hub 34, causing disengagement of the hub 34 and steering shaft and permitting removal of the steering wheel and air bag assembly from the steering shaft.

Figure 7:
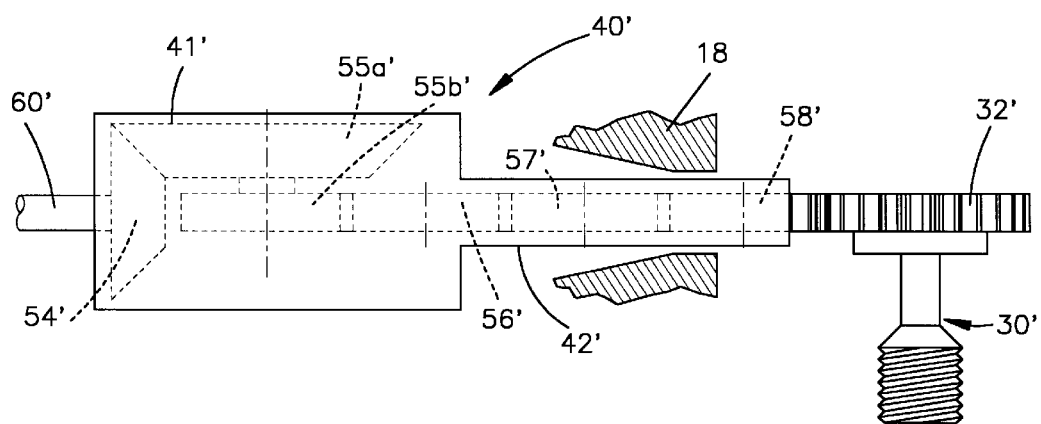
FIG. 7 is a schematic side view of an alternate embodiment of a multi-gear attachment tool in accordance with the present invention.

FIG. 7 illustrates an alternate embodiment of the present invention. In the embodiment of FIG. 7, similar structure to that of the previous embodiment is identified with the same reference numerals, but with a prime added. A multi-gear attachment tool 40' illustrated in FIG. 7 is substantially similar to the tool 40 described above, except that the housing is T-shaped instead of the L-shape of the previous embodiment. The T-shape is defined by a short leg, 41' and a long leg 42'. A further difference in the alternate embodiment of FIG. 7 is that the bevel gear portion 55a' of the gear 55' is inverted from its orientation in the previous embodiment. The axis of rotation of the bevel gear 54' intersects and is perpendicular to the axes of rotation of the spur gears 55b', 56', 57' and 58'. The configuration reduces the overall size of the housing required to support the gears.

Although the invention has been described with particularity and in some detail, it will be appreciated by those skilled in the art that changes and modifications can be made therein without departing from the scope and spirit of the invention.

Having described the invention, I claim:

1. An apparatus comprising:

a housing;

a channel within said housing;

a plurality of spur gears disposed within said channel and in gear meshing engagement, a first one of said plurality of spur gears protruding from said housing;

means to impart rotation to said plurality of spur gears, said means comprising first and second meshing bevel gears, said first bevel gear being rotatable about an axis coaxial with a second one of said plurality of spur gears, said first bevel gear being fixed for rotation with said second spur gear, said second bevel gear having a drive connection which, when rotated, causes rotation of said plurality of spur gears by rotating said first and second bevel gears; and a third spur gear meshing with said protruding spur gear and rotatable about an axis, and a threaded stem fixed to said third spur gear and rotatable about said axis with said third spur gear.

2. The apparatus of claim 1 wherein said housing includes means for resisting movement of said housing due to forces created by the meshing of said protruding spur gear and said third spur gear, said means including force transmitting surfaces on said housing which extend parallel to said axis of rotation of said second spur gear, said force transmitting surfaces transmitting to an adjacent structure forces which tend to move said housing.

3. The apparatus of claim 1 wherein said housing is L-shaped and has a first leg portion and a second leg portion, said second leg portion being perpendicular to said first leg portion and being longer than said first leg portion.

4. The apparatus of claim 3 wherein at least one of said first and second bevel gears is located in said first leg portion of said housing.

5. The apparatus of claim 1 wherein said housing is T-shaped and has a first leg portion and a second leg portion, said second leg portion being perpendicular to said first leg portion.

6. The apparatus of claim 5 wherein at least one of said first and second bevel gears is located in said first leg portion of said housing.

7. Apparatus comprising:

a housing;

a plurality of spur gears in said housing;

means supporting said plurality of spur gears for rotation in said housing, one of said plurality of spur gears protruding from said housing;

a second spur gear in meshing engagement with said protruding spur gear and rotatable about an axis; and a threaded stem fixed to said second spur gear and rotatable about said axis with said second spur gear.

8. The apparatus of claim 7 further comprising first and second meshing bevel gears, said first bevel gear being rotatable about an axis coaxial with a third one of said plurality of said gears, said first bevel gear being fixed for rotation with said third spur gear, said second bevel gear having a drive shaft which, when rotated, causes rotation of said plurality of spur gears by rotating said first and second bevel gears.

9. The apparatus of claim 8 wherein said housing includes means for resisting movement of said housing due to forces caused by the meshing of said protruding spur gear and said second spur gear, said means including force transmitting surfaces on said housing which extend parallel to said axis of rotation of said third spur gear said force transmitting surfaces transmitting to an adjacent structure forces which tend to move said housing.

10. The apparatus of claim 7 wherein said housing is L-shaped and has a first leg portion and second leg portion, said second leg portion being perpendicular to said first leg portion and being longer than said first leg portion.

11. The apparatus of claim 10 wherein at least one of said first and second bevel gears is located in said first leg portion of said housing.

12. The apparatus of claim 7 wherein said housing is T-shaped and has a first leg portion and second leg portion, said second leg portion being perpendicular to said first leg portion.

13. The apparatus of claim 12 wherein at least one of said first and second bevel gears is located in said first leg portion of said housing.

14. The apparatus of claim 13 wherein said threaded stem and said second spur gear comprise a fastener for fastening a steering wheel assembly to a steering shaft of a vehicle.

15. The apparatus of claim 14 wherein said housing and said plurality of spur gears comprise an attachment tool for rotating said fastener to fasten the steering wheel assembly to the steering shaft.

* * * * *